(12) United States Patent
Weber (10) Patent No.: US 7,191,273 B2
(45) Date of Patent: Mar. 13, 2007

(54) METHOD AND APPARATUS FOR SCHEDULING A RESOURCE TO MEET QUALITY-OF-SERVICE RESTRICTIONS

(75) Inventor: Wolf-Dietrich Weber, San Jose, CA (US)

(73) Assignee: Sonics, Inc., Mountain View, CA (US)

( * ) Notice: Subject to any disclaimer, the term of this patent is extended or adjusted under 35 U.S.C. 154(b) by 33 days.

(21) Appl. No.: 10/963,271

(22) Filed: Oct. 11, 2004

(65) Prior Publication Data
US 2005/0086404 A1 Apr. 21, 2005

Related U.S. Application Data

(63) Continuation of application No. 09/977,602, filed on Oct. 12, 2001, now Pat. No. 6,804,738.

(51) Int. Cl.
*G06F 13/14* (2006.01)
(52) U.S. Cl. .................. 710/244; 710/45; 710/117; 370/395.21; 370/395.41; 370/395.42
(58) Field of Classification Search .................... None
See application file for complete search history.

(56) References Cited

U.S. PATENT DOCUMENTS

| 4,688,188 A | 8/1987 | Washington |
| 5,107,257 A | 4/1992 | Fukuda |
| 5,218,456 A | 6/1993 | Stegbauer et al. |
| 5,265,257 A | 11/1993 | Simcoe et al. |
| 5,274,769 A | 12/1993 | Ishida |
| 5,287,464 A | 2/1994 | Kumar et al. |
| 5,363,484 A | 11/1994 | Desnoyers et al. |

(Continued)

FOREIGN PATENT DOCUMENTS

EP 02 70 7854 11/2004

(Continued)

OTHER PUBLICATIONS

Lamport, Leslie; "How to Make a Multiprocessor Computer That Correctly Executes Multiprocess Programs", IEEE Transactions on Computers, vol. C-28, No. 9, Sep. 1979, pp. 690-691.

(Continued)

*Primary Examiner*—Glenn A. Auve
(74) *Attorney, Agent, or Firm*—Blakely, Sokoloff, Taylor & Zafman, LLP (57) ABSTRACT

The present invention is directed to a method and apparatus for scheduling a resource to meet quality of service guarantees. In one embodiment of three levels of priority, if a channel of a first priority level is within its bandwidth allocation, then a request is issued from that channel. If there are no requests in channels at the first priority level that are within the allocation, requests from channels at the second priority level that are within their bandwidth allocation are chosen. If there are no requests of this type, requests from channels at the third priority level or requests from channels at the first and second levels that are outside of their bandwidth allocation are issued. The system may be implemented using rate-based scheduling.

31 Claims, 3 Drawing Sheets

U.S. PATENT DOCUMENTS

| | | | |
|---|---|---|---|
| 5,379,379 | A | 1/1995 | Schwartz et al. |
| 5,469,473 | A | 11/1995 | McClear et al. |
| 5,530,901 | A | 6/1996 | Nitta |
| 5,546,546 | A | 8/1996 | Bell et al. |
| 5,557,754 | A | 9/1996 | Stone et al. |
| 5,634,006 | A * | 5/1997 | Baugher et al. ............ 709/228 |
| 5,664,153 | A | 9/1997 | Farrell |
| 5,673,416 | A | 9/1997 | Chee et al. |
| 5,745,913 | A | 4/1998 | Pattin et al. |
| 5,748,629 | A | 5/1998 | Caldara et al. |
| 5,809,538 | A | 9/1998 | Pollmann et al. |
| 5,917,804 | A | 6/1999 | Shah et al. |
| 5,926,649 | A | 7/1999 | Ma et al. |
| 5,948,089 | A | 9/1999 | Wingard et al. |
| 5,982,780 | A | 11/1999 | Bohm et al. |
| 5,996,037 | A | 11/1999 | Emnett |
| 6,023,720 | A | 2/2000 | Aref et al. |
| 6,092,137 | A | 7/2000 | Huang et al. |
| 6,104,690 | A | 8/2000 | Feldman et al. |
| 6,119,183 | A | 9/2000 | Briel et al. |
| 6,122,690 | A | 9/2000 | Nannetti et al. |
| 6,141,713 | A | 10/2000 | Kang |
| 6,167,445 | A | 12/2000 | Gai et al. |
| 6,199,131 | B1 | 3/2001 | Melo et al. |
| 6,212,611 | B1 | 4/2001 | Nizar et al. |
| 6,253,269 | B1 | 6/2001 | Cranston et al. |
| 6,266,718 | B1 | 7/2001 | Klein |
| 6,330,225 | B1 | 12/2001 | Weber et al. |
| 6,335,932 | B2 | 1/2002 | Kadambi et al. |
| 6,363,445 | B1 | 3/2002 | Jeddeloh |
| 6,430,156 | B1 * | 8/2002 | Park et al. ................. 370/232 |
| 6,499,090 | B1 | 12/2002 | Hill et al. |
| 6,510,497 | B1 | 1/2003 | Strongin et al. |
| 6,530,007 | B2 | 3/2003 | Olarig et al. |
| 6,578,117 | B2 | 6/2003 | Weber |
| 6,628,609 | B2 | 9/2003 | Chapman et al. |
| 6,636,482 | B2 | 10/2003 | Cloonan et al. |
| 6,721,325 | B1 * | 4/2004 | Duckering et al. ...... 370/395.4 |
| 6,804,738 | B2 | 10/2004 | Weber |
| 6,804,757 | B2 | 10/2004 | Weber |
| 6,862,265 | B1 * | 3/2005 | Appala et al. .............. 370/235 |
| 6,961,834 | B2 | 11/2005 | Weber |
| 6,976,106 | B2 | 12/2005 | Tomlinson et al. |
| 2001/0026535 | A1 * | 10/2001 | Amou et al. ................ 370/235 |
| 2002/0129173 | A1 | 9/2002 | Weber et al. |
| 2002/0138687 | A1 | 9/2002 | Yang et al. |
| 2002/0174227 | A1 | 11/2002 | Hartsell et al. |
| 2003/0074504 | A1 | 4/2003 | Weber |
| 2003/0074519 | A1 | 4/2003 | Weber |
| 2003/0079080 | A1 | 4/2003 | DeMoney |

FOREIGN PATENT DOCUMENTS

| | | |
|---|---|---|
| EP | 02 72 1116 | 5/2006 |
| WO | WO 00/29956 A | 5/2000 |
| WO | WO 01/75620 A | 10/2001 |

OTHER PUBLICATIONS

Rixner, Scott et al., "Memory Access Scheduling", to appear in ISCA-27 (2000), Computer Systems Laboratory, Stanford University, Stanford, CA 94305, pp. 1-11.
Search Report for PCT/US02/05438, mailed May 24, 2002, 1 page.
Search Report for PCT/US02/05288, mailed May 20, 2002, 1 page.
Search Report for PCT/US02/05439, mailed Jun. 26, 2002, 1 page.
Search Report for PCT/US02/05287, mailed Jul. 11, 2002, 1 page.
Rixner et al., "A Bandwidth-Efficient Architecture for Media Processing", Micro-31, 1998, pp. 1-11.
Drew Wingard, "*MicroNetworks-Based Integration for SOCs.*" In Design Automation Conference, 2001, pp. 673-677, 5 pages.
Ron Ho, et al., "*The Future of Wires*". In Proceedings of the IEEE, vol. 89, No. 4, pp. 490-504, Apr. 2001, 15 pages.
William J. Dally, et al., "*Route Packets, Not Wires: On-Chip Interconnection Networks.*" In Design Automation Conference, pp. 684-689, Jun. 2001, 6 pages.
Jim Kurose, "*Open Issues and Challenges in Providing Quality of Service Guarantees in High-Speed Networks*", ACM Computer Communication Review, vol. 23, No. 1, pp. 6-15, Jan. 1993, 10 pages.
Hui Zhang, "*Service Disciplines for Guaranteed Performance Service in Packet-Switching Networks*", Proceedings of the IEEE, vol. 83, No. 10, Oct. 1995, pp. 1374-1396, 23 pages.
Dimitrios Stiliadis, et al., "*Latency-Rate Servers: A General Model for Analysis of Traffic Scheduling Algorithms*", In Proceedings of IEEE INFOCOM 96, Apr. 1996, pp. 111-119, 9 pages.
K. Lahiri, et al., "*LOTTERYBUS: A New High-Performance Communication Architecture for System-on-Chip Designs*". In Proceedings of Design Automation Conference 2003, Las Vegas, Jun. 2001, pp. 15-20, 6 pages.
William J. Dally, "*Virtual-channel Flow Control*", In Proceedings of the 17th Int. Symp. on Computer Architecture, ACM SIGARCH, May 1990, vol. 18, No. 2, pp. 60-68, 9 pages.
Drew Wingard, et al., "*Integration Architecture for System-on-a-Chip Design*", In Proc. of the 1998 Custom Integrated Circuits Conference, May 1998, pp. 85-88, 4 pages.
Weber, Wolf-Dietrich, et al., "Enabling Reuse via an IP Core-centric Communications Protocol: Open Core Protocol", In Proceedings of the IP 2000 System-on-Chip Conference Mar. 2000, pp. 1-5.
Ivo Adan and Jacques Resing, "Queueing Theory", Eindoven University of Technology, Feb. 14, 2001, pp. 23-27.
PCT International Search Report for PCT/US2004/035863, Int'l filing Oct. 27, 2004, mailed Aug. 9, 2005, 9 pages.
Wingard, Drew, "Sonics SOC Integration Architecture," Sonics, Inc., 1500 presentation, 1999, 25 pages, www.OCP-IP.org.
Kamas, Alan, "The SystemC OCP Models; An Overview of the SystemC Models for the Open Core Protocol," NASCUG, 2004, 30 pages.
Wingard, Drew, "Socket-Based Design Using Decoupled Interconnects," Sonics, Inc., 30 pages, downloaded Jun. 14, 2004, www.OCP-IP.org.
Haverinen, Anssi, "SystemC™ Based SoC Communication Modeling for the OCP Protocol," White Paper, Oct. 2002, V1.0, 39 pages.
Wingard, Drew, "Tiles—An Architectural Abstraction for Platform-Based Design," Perspective article 2, EDA Vision, Jun. 2002, 3 pages, www.edavision.com.
Weber, Wolf-Dietrich, "Efficient Shared DRAM Subsystems for SOCs," Sonics, Inc., 2001, 6 pages.
"Open Core Protocol Specification," OCP International Partnership, Release 1.0, 2001.
Wingard, Drew PhD., "Integrating Semiconductor IP Using µNetworks," ASIC Design, Jul. 2000 electronic engineering, 3 pages.
Wingard, Drew, "Tiles: the Heterogeneous Processing Abstraction for MPSoC," Sonics, Inc., Smart Interconnect IP, 2004, 35 pages, www.OCP-IP.org.
Chou, Joe, "System-Level Design Using OCP Based Transaction-Level Models," presentation, Denali MemCom Taiwan 2005, OCP International Partnership, 23 pages.
Wingard, Drew, "A Non-Blocking Intelligent Interconnect for AMBA-Connected SoCs," Sonics, Inc., CoWare Arm Developer's Conference, Oct. 6, 2005, 39 pages.
Weber, Wolf-Dietrich, et. al., "A Quality-of-Service Mechanism for Interconnection Networks In System-on-Chips," 1530-1591/05, 2005 IEEE, 6 pages.
Casini, Phil, "Measuring the Value of Third Party Interconnects," Sonics, Inc., White Paper, 2005, 11 pages, www.sonicsinc.com.
European Search Report for International Application No. EP 02 71 3653, mailed on May 29, 2006, pp. 3 total.

* cited by examiner

METHOD AND APPARATUS FOR SCHEDULING A RESOURCE TO MEET QUALITY-OF-SERVICE RESTRICTIONS

This application is a continuation application of and claims the benefit of U.S. application Ser. No. 09/977,602 filed Oct. 12, 2001, which will issue as U.S. Pat. No. 6,804,738 on Oct. 12, 2004.

FIELD OF THE INVENTION

The field of the invention relates to a system where access to a resource is scheduled to provide a particular quality-of-service to two or more requestors competing for access to that resource.

BACKGROUND

In computer systems it is common that a given resource (such as a system bus, a memory bank, etc.) is shared between several competing requesting devices or processes ("requesters") that would like to make use of the resource. Access to that resource therefore has to be arbitrated, in order to determine which requester can access the resource when there are concurrent and conflicting requests to the resource. It is desirable to be able to specify different quality-of-service (QOS) guarantees for different requestors in order for the system to operate properly. Examples of QOS guarantees include data bandwidth and latency. For example, it may be desirable to allow a processor to have very high-priority and therefore low-latency access to a memory system. Another example is that one might want a video system to have a certain reserved bandwidth on a system bus so that the video screen can be updated as required at a fixed frame rate.

Existing arbitration schemes that aim to provide QOS guarantees include fixed-priority arbitration and time division multiplexing. In fixed-priority arbitration each requestor is assigned a fixed priority and requesters are serviced in priority order. In time division multiplexing, each requestor is pre-allocated a certain set of fixed access periods during which it can access the resource. While these arbitration schemes have their value in certain systems, they fall short of providing QOS guarantees when there is a mix of requesters with different QOS requirements and perhaps unpredictable request arrival times. For example, it is not possible to give any kind of bandwidth guarantee to multiple different requestors if fixed-priority arbitration is used unless the exact request pattern of each initiator is known a priori. Time division multiplexing is inefficient when the arrival times of requests are not deterministic, or when the requests require differing amounts of service time from the resource depend on the type of request or the recent history of other requests.

What is desired is a resource scheduling scheme that can provide different QOS guarantees to different requesters and further can efficiently handle non-deterministic arrival and service times.

SUMMARY OF THE INVENTION

The present invention is directed to a method and apparatus for scheduling a resource to meet quality of service guarantees. In one embodiment of three levels of priority, if a channel of a first priority level is within its bandwidth allocation, then a request is issued from that channel. If there are no requests in channels at the first priority level that are within the allocation, requests from channels at the second priority level that are within their bandwidth allocation are chosen. If there are no requests of this type, requests from channels at the third priority level or requests from channels at the first and second levels that are outside of their bandwidth allocation are issued. The system may be implemented using rate-based scheduling.

BRIEF DESCRIPTION OF THE DRAWINGS

The objects, features and advantages of the invention will be apparent from the following detailed description in which.

DETAILED DESCRIPTION

Figure 1:
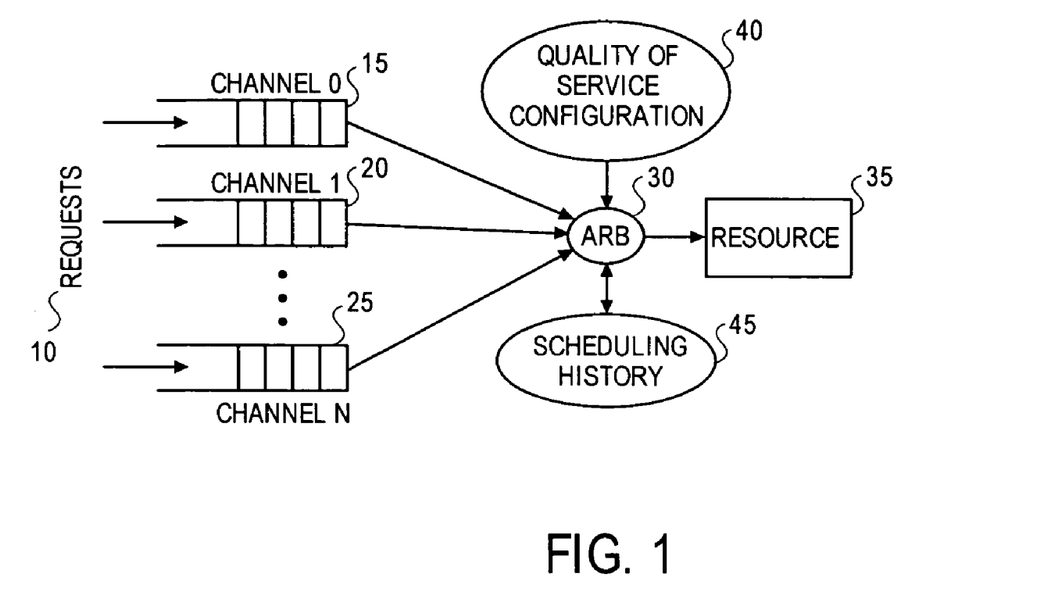
FIG. 1 is a simplified diagram of one embodiment of an arbitration system that operates in accordance with the technology of the present invention.

FIG. 1 shows one embodiment of an arbitration system. Requests 10 arrive from different requesting devices or processes and are stored in a channel, e.g., channels 15, 20, 25 that are contemplated to be logically or physically implemented. In this embodiment, each channel accommodates requests from one requestor. Thus, requests from device A are stored in channel 0 (15), requests from device B are stored in channel 1 (20), etc. In the present embodiment, it is assumed here that requests within each channel are serviced in the order they are received in each channel, but this is not a necessary requirement for the invention described herein.

The arbitration unit 30 is responsible for scheduling access by each channel to the resource 35. A resource can be a variety of different apparatuses or processes, including memory and the like. The arbitration unit 30 is configured with the desired quality-of-service (QOS) guarantees for each of the channels using the QOS configuration unit 40. QOS may include a variety of criteria including one or more minimum, maximum or ranges of performance criteria for a particular dataflow, process or device. The unit 30 also keeps track of recent scheduling decisions using the scheduling history unit 45. Although the QOS unit 40 and scheduling history unit 45 are illustrated as separate units, it is readily apparent that the functionality of one or both of the quality of service configuration unit 40 and scheduling history unit 45 can be configured to be part of the arbitration unit 30 or joined into a single unit coupled to the arbitration unit 30. Further, it is contemplated that the one or more of the units 30, 40, 45 may be physically part of the resource 35.

If more than one channel 15, 20, 25 has a request waiting for service, the arbitration unit 30 selects the channel that can proceed to service using the scheduling history and desired QOS information retrieved respectively from the scheduling history unit 45 and quality of service configuration unit 40. The next request of the selected channel proceeds to access the resource and exits the system.

In one embodiment, the arbiter 30 uses the scheduling history 45 to determine if certain QOS guarantees can be met. For example, it is possible that the amount of time needed to access the resource depends on the relative timing of access of the resource or the type of request. For example, when accessing a bi-directional system bus, it may take longer for a write request to access the bus if it has recently been accessed with a read request, because the bus direction may need to be turned around first. This information may be determined from the scheduling history 45 and in turn affects the scheduling history 45. As noted above, the amount of time needed to access the resource may also depend on the type of request. For example, when accessing a dynamic random access memory (DRAM) memory system, a request to an open DRAM page might take much less time than a request to a closed DRAM page.

In one embodiment, the different QOS modes used for scheduling may include priority service, allocated-bandwidth service and best-effort service. Each channel is assigned one QOS mode. For a channel to receive priority service or allocated-bandwidth service, it must be given a bandwidth allocation. Priority service provides bandwidth guarantees up to the allocated bandwidth, plus minimum latency service. Allocated-bandwidth service provides only bandwidth guarantees up to the allocated bandwidth. Best-effort service provides no QOS guarantees, and may actually receive no service at all. Additional quality-of-service modes are possible.

Further arbitration, e.g., using the scheduling history, may be used to determine selection of one of a plurality of pending requests at the same level of QOS. For example, if the scheduling history indicates the resource, e.g. a bus, has been operating in one direction, the arbiter may grant priority to requests arguing operation in that same direction.

In the present embodiment, each of the channels 15, 20, 25 are allocated one QOS mode and this information is placed in the QOS configuration unit 40. In order to allocate bandwidth to different channels, it is important to calculate the overall bandwidth available in the resource that is being accessed. This total bandwidth may be relatively easy to calculate, or it may depend on the request stream itself and must therefore be estimated using a particular expected request stream for a particular system. For example, when estimating the total available bandwidth of a DRAM system, it may be necessary to estimate the expected fraction of page hits and page misses in the request stream. When it is not possible to make a precise estimate of the total available bandwidth, a conservative estimate should be made that can be achieved under all or substantially all foreseeable conditions in the given system.

In the present embodiment, priority channels and allocated-bandwidth channels are all allocated a certain amount of bandwidth. In order to meet the QOS guarantees under all conditions, no more than the total available bandwidth of the resource should be allocated to these channels.

Channels using a priority QOS mode or allocated-bandwidth mode receive a higher QOS than channels that use a best-effort mode, but only while the channels continue to operate within their respective bandwidth allocation. It is possible for a channel to request more than its allocated bandwidth, but in this case the QOS may degrade to below or equal best-effort channels.

Figure 2:
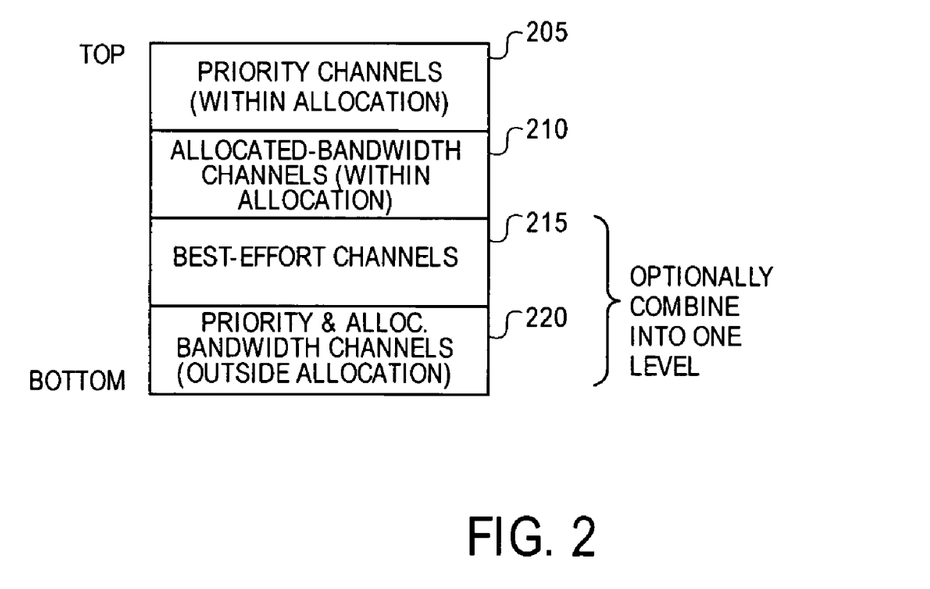
FIG. 2 illustrates one embodiment of priority order.

FIG. 2 illustrates one example of the priority order in which channels get access to a resource. The top level 205 is reserved for priority channels that are within their bandwidth allocation. If there are any channels with requests in this category, they are provided access (serviced) as soon as possible, thus achieving low-latency access to the resource. The next lower level 210 is for allocated-bandwidth channels that are within their bandwidth allocation. Thus, if there are no eligible priority requests, allocated-bandwidth requests are serviced. Best-effort channels and priority or allocated-bandwidth channels that are outside of their allocated bandwidth are serviced with the lowest priority. These two groups can either be combined or serviced as two separate priorities 215, 220 as shown in FIG. 2.

Using this scheduling method, allocated bandwidth and priority channels are substantially guaranteed to receive their allocated bandwidth. Amongst the two, priority channels are serviced with a higher priority, so these channels experience a lower access latency to the resource. If and when the priority and allocated-bandwidth channels are not using up the total available bandwidth of the resource, best-effort and other channels that are outside of their allocation can make use of the resource, thus ensuring that the resource does not sit idle while there are requests waiting.

Figure 3:
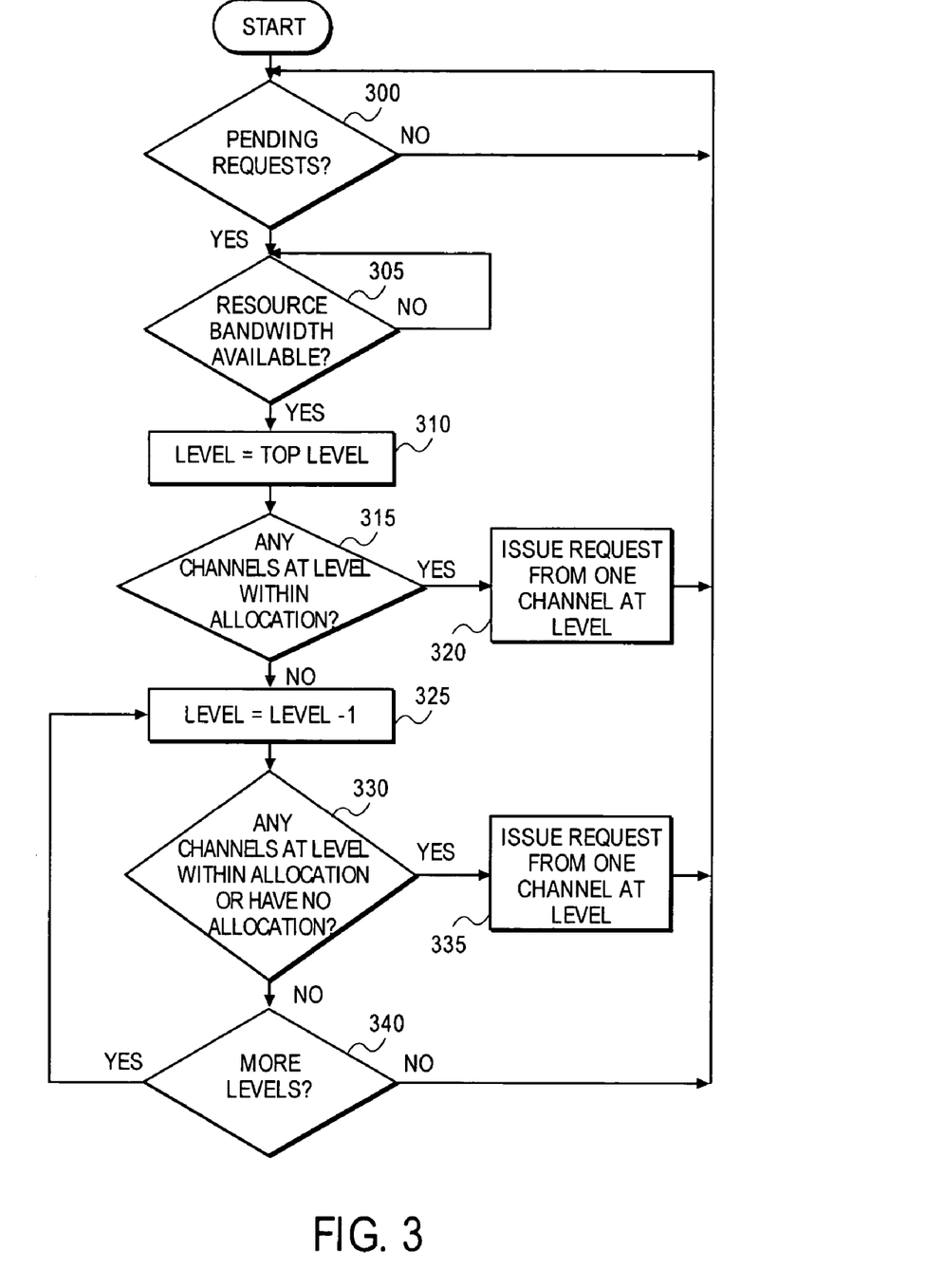
FIG. 3 is a simplified flow diagram illustrating one embodiment of an arbiter.

FIG. 3 illustrates one embodiment of an arbitration process. For purposes of discussion, it is assumed that one channel is assigned to each level. However, it is contemplated that multiple channels can be operative at the same level. At step 300, if there are pending requests to be service by a particular resource, and resource bandwidth is available, step 305, a first level, for example, the level with the highest priority of service is examined, step 310. At step 315, if any requests from channels at the first level are within their bandwidth allocation, a request is issued from one channel of the first level, step 320. If requests from channels at the first level are not within allocation, requests from channels at the next level, which in one embodiment are channels at a level of a next-lower priority, are examined, step 325. If the channels at the level are within allocation, or alternately are not assigned an allocation bandwidth, step 330, a request is issued from a channel of that level, step 335. This process continues, step 340, for each level of channels.

Figure 4:
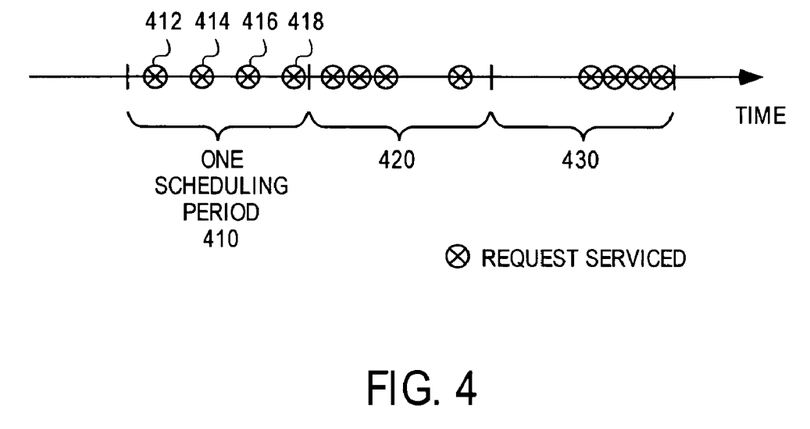
FIG. 4 illustrates an embodiment of rate-based scheduling.

Utilizing the scheduling system of the present invention, the system can determine whether a given channel is operating within or beyond its allocated bandwidth. One way to implement this mechanism is described by the embodiment of FIG. 4. As shown in FIG. 4, time is divided into equal-sized scheduling periods, for example, periods 410, 420, 430. Bandwidth is allocated on the basis of a fixed number of requests per scheduling period. The scheduling unit decides to schedule those requests at any suitable time during the scheduling period. For purposes of discussion, this scheduling method is referred to as "rate-based" scheduling. By allowing the scheduling unit to schedule requests at any time during the scheduling period it does not rely on a known request arrival time. Furthermore, the scheduling unit is able to schedule requests so as to maximize the efficiency of the resource. In the example of FIG. 4, four requests 412, 414, 416, 418 are always being scheduled in each scheduling period, but the exact time that each request is processed by the resource varies from scheduling period, e.g., period 420, to scheduling period, e.g., period 430.

Figure 5:
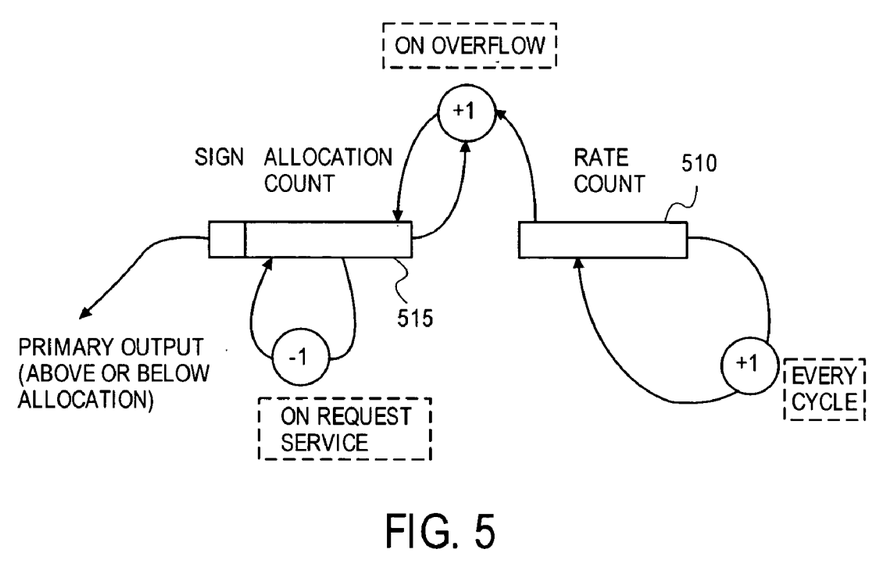
FIG. 5 is a simplified diagram illustrating one embodiment of rate-based scheduling in accordance with the teachings of the present invention.

One embodiment of rate-based scheduling is shown in FIG. 5. The advantage of this embodiment is that it requires very little state—just two counters per channel. The mechanism shown is for one channel and is sufficient to determine whether the given channel is above or below its bandwidth allocation. Multiple versions of this can be implemented to support multiple channels. In addition, it is contemplated that the functionality described can be implemented a variety of ways.

A rate counter 510 is incremented at some small periodic interval, such as once every cycle. In the present embodiment, the rate counter 510 is configured to have a maximum value that is based on the allocated bandwidth of the channel. For example, if the bandwidth allocated to a particular channel is ten requests during each 100-cycle scheduling period, then the rate counter would be set up with a maximum value of 10.

Once the rate counter 510 reaches its maximum value, it causes the allocation counter 515 to be incremented, thus signaling that there is one more request "credit" available for that channel. The rate counter 510 resets and begins counting again. In one embodiment the rate counter is implemented as a simple register or location in memory with associated logic to test the value of the counter. Alternately, the overflow bit of the counter may be used to increment the allocation counter 515 and reset the rate counter 510.

Each time a request is sent from that channel to the resource, the allocation counter is decremented, thus removing a credit. As long as the allocation count is positive, the channel is operating within its bandwidth allocation.

In one embodiment, the allocation count does not go beyond the number of requests allocated per scheduling period (either positive or negative). Saturation logic is included to insure that the allocation count does not exceed a specified saturation value. For example, a register or memory corresponding to counter 515 may include control logic that would not change the value in the counter beyond positive saturation value or negative saturation value. This enables the bandwidth use history to fade with time, allowing a channel to use more than its allocation during certain periods when bandwidth is available, while still maintaining the bandwidth guarantees when bandwidth becomes tight again.

While the above-described scheduling method is suitable for all kinds of systems that have multiple requesters competing for a shared resource, it is particularly well suited for shared dynamic random access memory (DRAM) memory systems. DRAM systems are especially difficult to schedule, because the service time of each request depends on the request type (e.g., read or write, burst size, etc.) and the request history which determines whether a particular request hits a page that is open or whether a page must first be opened before it can be accessed. Given a conservative estimate of the bandwidth that can be achieved with a certain set of request streams from different initiating (requester) devices or processes, the described scheduling method can guarantee different QOS to different requestors while achieving a very high DRAM efficiency.

The invention has been described in conjunction with the preferred embodiment. It is evident that numerous alternatives, modifications, variations and uses will be apparent to those skilled in the art in light of the foregoing description.

What is claimed is:

1. A method, comprising:
scheduling access to a resource to meet quality of service guarantees for requests within an apparatus;
storing a first request in a first channel, wherein the first channel is assigned with a first priority level;
keeping track of bandwidth usage from the first channel;
demoting a priority level of the first channel based on exceeding an allotted amount of bandwidth usage from the first channel in a specified period of time;
scheduling the first channel to issue the first request to a resource to meet quality of service guarantees for requests within the apparatus; and
keeping track of the first channel's bandwidth usage history by incrementing a rate counter every unit cycle and by incrementing an allocation counter every predetermined number of rate count and decrementing the allocation counter each time a request is received from the first channel.

2. A method, comprising:
scheduling access to a resource to meet quality of service guarantees for requests;
storing a first request in a first channel that is assigned with a first priority level;
keeping track of scheduling history from the first channel;
demoting a priority level of the first channel based on exceeding a tracked feature of scheduling history associated with the first channel in a specified period of time, wherein the tracked feature of scheduling history associated with the channel is a type of request within a request stream; and
scheduling the first channel to issue the first request to a resource to meet quality of service guarantees for requests.

3. The method of claim 2, further comprising:
keeping track of bandwidth usage from the first channel; and
demoting a priority level of the first channel based on exceeding an allotted amount of bandwidth usage from the first channel in a specified period of time.

4. The method of claim 3, further comprising:
continuing to grant access to the resource to requests from the first channel, if the first channel is at an assigned highest priority and is within its allotted amount of bandwidth usage regardless of whether requests are waiting for access in lower priority channels.

5. The method of claim 3, further comprising:
granting access to the resource to a second request from a second channel at a second priority level that is within its allotted amount of bandwidth usage if there are no requests in channels at the first priority level that are within their allotted amount of bandwidth usage.

6. The method of claim 3, further comprising:
granting access to the resource to a third request from a third channel at a third priority level if there are no requests in channels at the first priority level or a second priority level that are within their allotted amount of bandwidth usage.

7. The method of claim 3, further comprising:
promoting the priority level of the first channel when the first channel is back within its allotted amount of bandwidth usage.

8. The method of claim 3, further comprising:
using scheduling history to decide whether the first channel is within its allocated amount of bandwidth usage.

9. The method of claim 3, further comprising:
using rate-based scheduling to decide whether the first channel is within its allocated amount of bandwidth usage.

10. A method, comprising:
scheduling access to a resource to meet quality of service guarantees for requests within an apparatus;
storing a first request in a first channel that is assigned with a first priority level;
keeping track of scheduling history from the first channel;
demoting a priority level of the first channel based on exceeding a tracked feature of scheduling history associated with the first channel in a specified period of time; and
scheduling the first channel to issue the first request to a resource to meet quality of service guarantees for requests within the apparatus, wherein the tracked feature of scheduling history associated with the channel is an amount of time needed to access the resource relative to a current timing of accessing the resource.

11. The method of claim 10, further comprising:
keeping track of bandwidth usage from the first channel; and
demoting a priority level of the first channel based on exceeding an allotted amount of bandwidth usage from the first channel in a specified period of time.

12. The method of claim 11, further comprising:
continuing to grant access to the resource to requests from the first channel, if the first channel is at an assigned highest priority and is within its allotted amount of bandwidth usage regardless of whether requests are waiting for access in lower priority channels.

13. The method of claim 11, further comprising:
granting access to the resource to a second request from a second channel at a second priority level that is within its allotted amount of bandwidth usage if there are no requests in channels at the first priority level that are within their allotted amount of bandwidth usage.

14. The method of claim 11, further comprising:
granting access to the resource to a third request from a third channel at a third priority level if there are no requests in channels at the first priority level or a second priority level that are within their allotted amount of bandwidth usage.

15. The method of claim 11, further comprising:
promoting the priority level of the first channel when the first channel is back within its allotted amount of bandwidth usage.

16. The method of claim 11, further comprising:
using scheduling history to decide whether the first channel is within its allocated amount of bandwidth usage.

17. The method of claim 11, further comprising:
using rate-based scheduling to decide whether the first channel is within its allocated amount of bandwidth usage.

18. An apparatus, comprising:
means for scheduling access to a resource to meet quality of service guarantees for requests within the apparatus;
means for storing a first request in a first channel, wherein the first channel is assigned with a first priority level;
means for keeping track of bandwidth usage from the first channel;
means for demoting a priority level of the first channel based on exceeding an allotted amount of bandwidth usage from the first channel in a specified period of time;
means for scheduling the first channel to issue the first request to a resource to meet quality of service guarantees for requests within the apparatus; and
means for keeping track of the first channel's bandwidth usage history by incrementing a rate counter every unit cycle and by incrementing an allocation counter every predetermined number of rate count and decrementing the allocation counter each time a request is received from the first channel.

19. An apparatus, comprising:
means for scheduling access to a resource to meet quality of service guarantees for requests;
a first channel that is assigned with a first priority level to store a first request;
means for keeping track of bandwidth usage from the first channel;
means for demoting a priority level of the first channel based on exceeding an allotted amount of bandwidth usage from the first channel in a specified period of time;
means for scheduling the first channel to issue the first request to a resource to meet quality of service guarantees for requests;
an allocation counter; and
a rate counter to keep track of the first channel's bandwidth usage history by incrementing the rate counter every unit cycle and by incrementing the allocation counter every predetermined number of rate count and decrementing the allocation counter each time a request is received from the first channel.

20. An apparatus, comprising:
means for scheduling access to a resource to meet guality of service guarantees for requests within the apparatus;
means for storing a first request in a first channel, wherein the first channel is assigned with a first priority level;
means for keeping track of scheduling history from the first channel;
means for demoting a priority level of the first channel based on exceeding a tracked feature of scheduling history associated with the first channel in a specified period of time; and
means for scheduling the first channel to issue the first request to a resource to meet quality of service guarantees for requests within the apparatus, wherein the tracked feature of scheduling history associated with the channel is a type of request within a request stream.

21. The method of claim 20, further comprising:
keeping track of bandwidth usage from the first channel; and
demoting a priority level of the first channel based on exceeding an allotted amount of bandwidth usage from the first channel in a specified period of time.

22. The method of claim 21, further comprising:
continuing to grant access to the resource to requests from the first channel, if the first channel is at an assigned highest priority and is within its allotted amount of bandwidth usage regardless of whether requests are waiting for access in lower priority channels.

23. The method of claim 21, further comprising:
granting access to the resource to a second request from a second channel at a second priority level that is within its allotted amount of bandwidth usage if there are no requests in channels at the first priority level that are within their allotted amount of bandwidth usage.

24. The method of claim 21, further comprising:
granting access to the resource to a third request from a third channel at a third priority level if there are no requests in channels at the first priority level or a second priority level that are within their allotted amount of bandwidth usage.

25. The method of claim 21, further comprising:
promoting the priority level of the first channel when the first channel is back within its allotted amount of bandwidth usage.

26. The method of claim 21, further comprising:
using scheduling history to decide whether the first channel is within its allocated amount of bandwidth usage.

27. The method of claim 21, further comprising:
using rate-based scheduling to decide whether the first channel is within its allocated amount of bandwidth usage.

28. An apparatus, comprising:
means for scheduling access to a resource to meet quality of service guarantees for requests;
a first channel that is assigned with a first priority level to store a first request;
means for keeping track of scheduling history from the first channel;
means for demoting a priority level of the first channel based on exceeding a tracked feature of scheduling history associated with the first channel in a specified period of time, wherein the tracked feature of scheduling history associated with the channel is an amount of time needed to access the resource relative to a current timing of accessing the resource; and
means for scheduling the first channel to issue the first request to a resource to meet quality of service guarantees for request.

29. An apparatus, comprising:
an arbiter configured to schedule access to a resource for requests from a plurality of channels within the apparatus, where one or more of the channels have an assigned priority level and convey to the arbiter requests to access the resource, the arbiter configured to determine if the resource is available to service requests within the apparatus, the arbiter configured to demote a priority level of a first channel based on exceeding a tracked feature of scheduling history associated with the first channel in a specified period of time, the arbiter configured with a quality-of-service (QOS) guarantee for requests from the first channel, the arbiter configured to schedule the first channel to issue a first request to the resource to meet the quality of service guarantee for the first request, wherein the tracked feature of scheduling history associated with the channel is an amount of time needed to access the resource relative to a current timing of accessing the resource.

30. The apparatus of claim 29, wherein the arbiter is configured to continuously grant access to the resource to requests from the first channel, if the first channel is at an assigned highest priority and is within its allotted amount of bandwidth usage regardless of whether requests are waiting for access in lower priority channels.

31. The apparatus of claim 29, wherein the arbiter is configured to promote the priority level of the first channel when the first channel is back within its allotted amount of bandwidth usage.

* * * * *

INTER PARTES REEXAMINATION CERTIFICATE (1246th)
United States Patent
Weber (10) Number: US 7,191,273 C1
(45) Certificate Issued: Mar. 16, 2016

(54) METHOD AND APPARATUS FOR SCHEDULING A RESOURCE TO MEET QUALITY-OF-SERVICE RESTRICTIONS

(75) Inventor: Wolf-Dietrich Weber, San Jose, CA (US)

(73) Assignee: SONICS, INC.

Reexamination Request:
No. 95/000,663, Apr. 13, 2012

Reexamination Certificate for:
Patent No.: 7,191,273
Issued: Mar. 13, 2007
Appl. No.: 10/963,271
Filed: Oct. 11, 2004

Related U.S. Application Data (63) Continuation of application No. 09/977,602, filed on Oct. 12, 2001, now Pat. No. 6,804,738.

(51) Int. Cl.
*G06F 13/14* (2006.01)
*G06F 9/48* (2006.01)
*H04L 12/851* (2013.01)

(52) U.S. Cl.
CPC .............. *G06F 9/4887* (2013.01); *H04L 47/24* (2013.01)

(58) Field of Classification Search
None
See application file for complete search history.

(56) References Cited

To view the complete listing of prior art documents cited during the proceeding for Reexamination Control Number 95/000,663, please refer to the USPTO's public Patent Application Information Retrieval (PAIR) system under the Display References tab.

*Primary Examiner* — Simon Ke (57) ABSTRACT

The present invention is directed to a method and apparatus for scheduling a resource to meet quality of service guarantees. In one embodiment of three levels of priority, if a channel of a first priority level is within its bandwidth allocation, then a request is issued from that channel. If there are no requests in channels at the first priority level that are within the allocation, requests from channels at the second priority level that are within their bandwidth allocation are chosen. If there are no requests of this type, requests from channels at the third priority level or requests from channels at the first and second levels that are outside of their bandwidth allocation are issued. The system may be implemented using rate-based scheduling.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 2-17 and 20-31 are cancelled.

Claims 1, 18 and 19 were not reexamined.

\* \* \* \* \*